United States Patent [19]

Pedronno et al.

[11] Patent Number: 5,664,839
[45] Date of Patent: Sep. 9, 1997

[54] LOCKING SYSTEM FOR A MOVABLE ELEMENT OF A SEAT OF AN AUTOMOTIVE VEHICLE

[75] Inventors: Philippe Pedronno, Marcoussis; Bernard Denis, Gretz-Armainvilliers, both of France

[73] Assignee: Bertrand Faure Equipements S.A., Boulogne, France

[21] Appl. No.: 490,398

[22] Filed: Jun. 14, 1995

[30] Foreign Application Priority Data

Jun. 14, 1994 [FR] France ................. 94 07494

[51] Int. Cl.[6] .................................................. B60N 2/02
[52] U.S. Cl. ........................ 297/378.13; 296/65.1; 296/66
[58] Field of Search ............... 297/378.13; 296/65.1, 296/66

[56] References Cited

U.S. PATENT DOCUMENTS

| | | | |
|---|---|---|---|
| 3,410,600 | 11/1968 | Thorpe | 296/66 |
| 3,915,493 | 10/1975 | Brown | |
| 4,583,782 | 4/1986 | Mikuniya | |
| 4,636,005 | 1/1987 | Bolz et al. | 297/378.13 |
| 4,684,175 | 8/1987 | Trutter | 296/65.1 |
| 4,866,820 | 9/1989 | Hassmann | 296/65.1 |
| 4,978,157 | 12/1990 | Murakami | 297/378.13 |

FOREIGN PATENT DOCUMENTS

| | | |
|---|---|---|
| 0 375 636 | 6/1990 | European Pat. Off. . |
| 0 580 315 | 1/1994 | European Pat. Off. . |
| 34 21 564 | 12/1985 | Germany . |
| 0229625 | 10/1986 | Japan ................. 296/65.1 |
| 81/02549 | 9/1981 | WIPO . |

Primary Examiner—Peter R. Brown
Assistant Examiner—Anthony D. Barfield
Attorney, Agent, or Firm—Pollock, Vande, Sande & Priddy

[57] ABSTRACT

The system for locking a movable element of a seat to a stationary element comprises a wall of a first one of said elements which is provided with a window into which a hook connected to the other element penetrates following an insertion direction substantially perpendicular to the wall and a resiliently retractable interlocking member constituted by a ring made of a wire of a material resistant to shearing. A shiftable part of the ring extends in contact with the wall across the window. The ring comprises two ends spaced apart from the shiftable part and oriented in a same axial direction perpendicular to the wall and around which the ring can be pivoted, the ends being offset one with respect to the other and the axes of the ends being maintained in a common plane which is stationary with respect to the support. The shiftable part is able to shift by an elastic deformation of the wire in a direction parallel to the wall and cooperates with the hook to provide reliable interlocking.

8 Claims, 2 Drawing Sheets

LOCKING SYSTEM FOR A MOVABLE ELEMENT OF A SEAT OF AN AUTOMOTIVE VEHICLE

FIELD OF THE INVENTION

The present invention concerns a system for locking a movable element of a seat of an automotive vehicle to a stationary element, such as for example for the locking, in the upright position, of the back of a reclining seat to an element of the car body, or even for the locking of such a seat to the floor board of the vehicle.

BACKGROUND OF THE INVENTION

Generally speaking, such systems must provide an automatic locking when the movable element is brought into the position in which it must be locked, the unlocking being operated by a manual control means such as a pushing device.

Known locking systems comprise a hook fastened to one element as well as a movable interlocking member which is resiliently retractable and is mounted onto the other element in order to cooperate with the hook. For example the interlocking member can be a turning lever which comprises a bent back end part, bevelled so that the lever swings out when this end part enters into contact with the hook, and which then gets caught by the hook as a result of a pivoting in the opposite direction, while being retracted by a spring.

The unlocking is assured by acting on the lever, against the tension of the spring, with the help of a pushing device which causes the pivoting of the lever in order to uncouple its end from the hook. The pushing device can be made out of the same piece as the lever, or it can be constituted by a separate piece. In other systems, the interlocking member, instead of swinging out, is movable by translational motion, and it is also pushed by a spring to engage itself over the hook and provide the interlocking of the two elements.

Some of these systems require a huge number of parts: lever, swivelling axis, spring, pushing device, etc., and this is increasing their price and is rendering the assembling complicated. Others show only an unreliable behaviour in case of an impact, due to the fact that in such a case the extremity of the lever can be withdrawn from the hook.

One also knows, mainly from the document DE-A-3421564, a locking system in which the lock is constituted by an elastically deformable wire, which is connected by one end to a wall of an element of a seat and which extends itself against the said wall. A shiftable part of the wire stretches itself out across a window provided in the wall and cooperates with the hook when the latter is engaged into the window. The unlocking is operated by bending the wire so as to disengage it from the hook. It mainly results therefrom that the distance between the window and the clamping of the wire must be relatively important in order to allow a sufficient release of the wire as a result of this deflection, this entailing an important space requirement.

Moreover one knows, from the document WO-A-8102549, a locking system in which the lock is constituted by a wire worked so as to have the shape of a kind of ring mounted in a pivoting manner in a bearing connected to the base plate of a seat cushion, the swiwel axis being parallel to said base plate. A first part of this ring extends in a radial vertical plane and comprises a section which is parallel to the swivel axis and which is used as the element for the locking over a hook fastened to the floor of the vehicle. Another part of the ring extends also radially, perpendicular to the first part, and constitutes a lever, operated by an unlocking handle, in order to achieve the pivoting of the ring and to disengage the said first part from the hook. The two ends of the ring extend in parallel one with respect to the other in the direction of the swivel axis and are maintained in a fixed position on the base plate. The retracting of the ring from its locking position is provided by the rotating couple resulting from the deformation of the ring during its pivoting. All the strains tending to lift up the seat cushion are born by the ring itself, that transmits them to the bearing and to the clampings of the ends, and these strains result in important bending constraints in the wire of the ring, liable to entail its deformation and poor locking.

BRIEF DESCRIPTION OF THE INVENTION

It is the aim of the present invention to find a remedy to the above mentioned problems and it takes more particularly aim at providing a reliable interlocking, by resisting important strains and at requiring only a minimum number of parts, whereas the assembling is easy.

According to the present invention, these objects are achieved by a system for locking a movable element of a seat to a stationary element, the system being of the kind comprising a movable resiliently retractable interlocking member which is constituted by a wire made of a material resistant to shearing, which is assembled to a first one of the said elements and which is intended to cooperate with a stationary hook connected to the second element. The said first element including a support comprising a combined wall provided with a window into which the said hook penetrates following an insertion direction substantially perpendicular to the said wall, and the said wire comprising a shiftable part which is running in contact with the said wall across the window as well as another part which is linked to the support, the shiftable part being able to change the position by an elastic deformation of the wire in a direction parallel to the wall so as to be capable to cooperate with the hook in order to prevent its withdrawing when it is inserted through the window.

According to the invention this system is characterized in that the wire is worked so as to have the shape of a ring, a ring which has one part constituting the said shiftable part and which comprises two ends spaced apart from the said shiftable part and oriented in the same axial direction perpendicular to the wall and around which the said ring can be pivoted, the said ends being offset, one with respect to the other and the axes of the said ends being maintained in a common plane which is stationary with respect to the said support.

In this system the wire constitutes at the same time the locking member and the pull-back spring, the strength of the resilient return motion resulting from the elasticity belonging to the wire.

Moreover, it is the wire itself which is assuring the interlocking and which is supporting the strains exerted by the hook on the said wire when both elements tend to be removed one from the other. The shiftable part of the wire being in abutment against the wall on both sides of the window, the strains exerted by the hook on the said window are consequently transmitted directly to the wall and therefore to the seat element to be locked. The constraints undergone by the wire in the shiftable part, to which the hook is clinging, are mainly shearing strengths to which the wire resists very well even if it has a relatively reduced diameter. So, the locking system according to the invention presents the advantage that it imparts directly to the structure the loads which tend to remove the two interlocked elements one from the other and to subject the locking member to shearing constraints, constraints to which the materials currently used for such elements resist better than to tensile or bending strengths.

On the other hand, the manufacturing of the locking device is not expensive as it is constituted by a mere wire, for example made of steel, which has only to be bent in an appropriate manner, and just one single part has to be handled for setting the said device.

The elastic pull-back strength results from the special relative arrangement of the end parts of the ring and from keeping these ends in a stationary position within the support. Indeed, as the two ends of the wire constituting the ring are offset laterally, a rotation of the said ring around the common direction of the said ends brings about a global resilient deformation of the ring (essentially a torsional deformation of the wire in the area of the ring remote from its ends). During such a rotation the ring remains however substantially plan, but it tends to come back into its starting position.

A particular advantage results from the fact that the ends of the ring are oriented perpendicularly to the wall, and consequently perpendicularly to the shiftable part. As a result thereof this shiftable part remains permanently in abutment against the wall, whatever the position of the ring. Consequently, this shiftable part works always perfectly under shearing strengths, even if the inclination of the ring varies somewhat as a result of a possible shifting (in the plane of the wall) of the hook with respect to the window.

Moreover, this arrangement allows a decrease in the space requirement with respect to the system disclosed in the document DE-A-3421564, due to the fact that the retention of the wire against the wall can be brought closer to the window, while maintaining at the same time an important range of clearance for the shiftable part. Indeed, in the course of its shifting, the wire does nearly not work under deflection but mainly under torsion in its part located in the rotation axis.

According to a special arrangement, the ring has a generally rectangular shape and the two said ends are oriented in the direction of one side of the said rectangle constituting a rotation axis of the ring.

Preferably, the said ends are extending out in the same direction, towards the exterior of the said rectangle, one end being in the direct prolongation of the side of the rectangle constituting the rotation axis, and the other end being a right angle prolongation of the contiguous side.

This arrangement greatly facilitates the mounting of the ring into the system, the two ends being liable to be introduced at the same time into their bearing without deforming the ring.

Other characteristics and advantages will become apparent from the description that will be given here below of an interlocking system of a reclining back part of the backseat of a motor car.

Reference is made to the drawings joined hereto, wherein.

Figure 1:
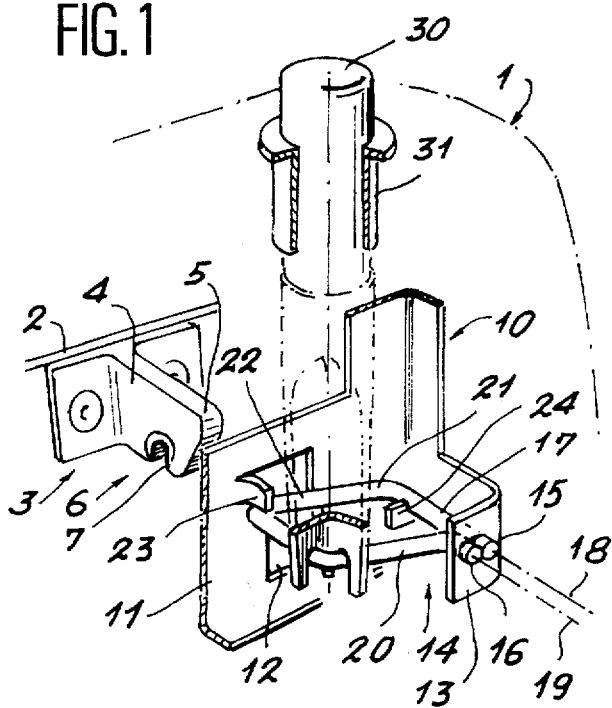
FIG. 1 is a view of the locking system when the back of the seat is not locked.
Figure 7:
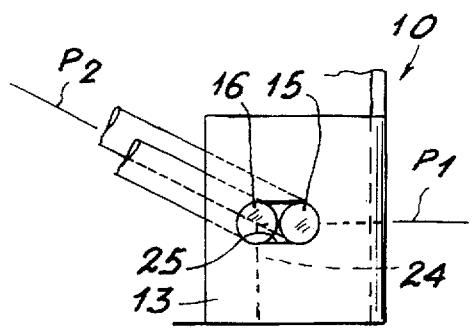
Figure 2:
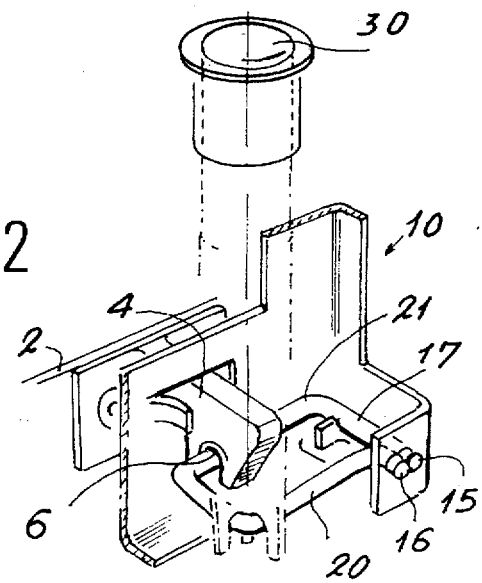
FIG. 2 is a similar view when the back of the seat is locked.
Figure 3:
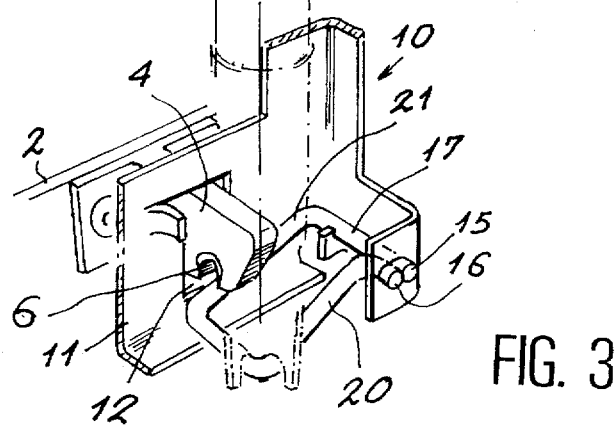
FIG. 3 is a similar view at the moment of the unlocking.
Figure 4:
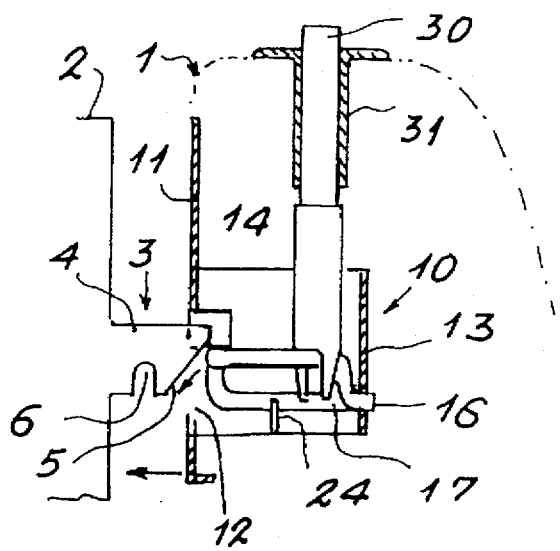
Figure 5:
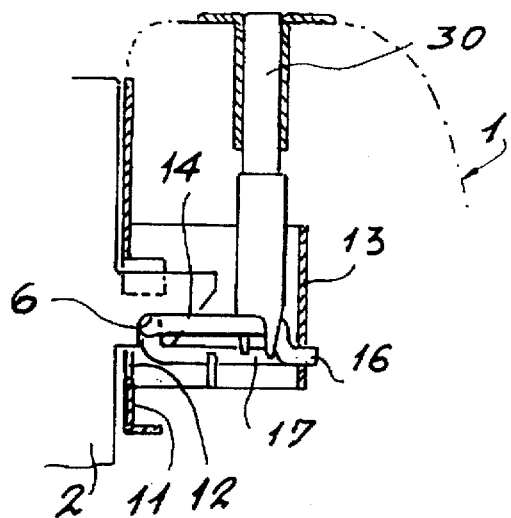
Figure 6:
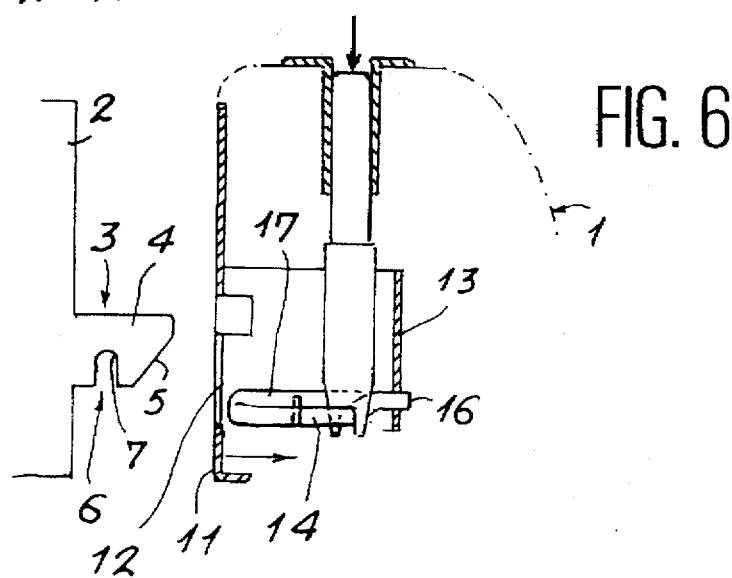

FIGS. 4 and 5 and 6 are schematic illustrations of the different positions of the ring and of the unlocking pushing device corresponding to the FIGS. 1, 2 and 3 respectively, FIG. 7 is a detailed view of the fastening of the ends of the ring.

DETAILED DESCRIPTION OF THE INVENTION

The drawing of FIG. 1 represents the upper left angle part of a reclining back part 1 of a backseat, which must be able to be locked in an upright position to an element 2 of the car body. On this element 2 there fastened a hook 3 which is constituted by a piece having a T-shaped cross section, whereof the central arm 4 extends out towards the back of the seat and comprises a sloping tip 5 intended to allow, as will be seen later on, the automatic interlocking at the end of the lifting motion of the back of the seat. The central arm 4 is provided also with a notch 6 whereof the front face 7 extends vertically.

The back of the seat 1 comprises in its thickness a support 10 which is made of a folded sheet and which can be an integral part of the structure of the back of the seat. The support 10 comprises a wall 11 out of which the window 12 has been cut at a place located opposite to the hook 3, and into which the central arm 4 can penetrate with a minimum clearance. The support 10 also comprises a return 13 integral of the wall 11 and parallel with respect to the latter, this return being shaped by folding the sheet constituting the support. Between the wall 11 and the return 13 there is located a ring 14 of a generally rectangular shape, made, for example, out of a steel wire having a diameter of a few millimeters. This ring 14 is obtained by a bending of a wire executed in such a way that the ends 15, 16 are parallel and oriented in the same direction, towards the exterior of the rectangle, and that they are practically in contact one with the other. The end 15 is a direct prolongation of the small side 17 of the rectangle, whereof the axis 18 constitutes a rotation axis for the ring. The end 16 is a prolongation of a large side 20 of the rectangle but at a right angle and oriented towards the return 13.

The two ends 15, 16 penetrate simultaneously into a bearing constituted by an oblong hole 25 extending horizontally and worked into the return 13, where they are maintained without a possibility to move but being however able to swivel around themselves. The axes 18, 19 of the ends 15, 16 are consequently kept in a fixed horizontal plane P1 (FIG. 7).

The distance between the wall 11 and the return 13 is substantially the same as the width of the ring, so that the latter cannot be moved horizontally, and that its other large side 21 is in abutment against the wall 11.

The length of this large side 21 is such that it stretches out before the window 12 and projects beyond each of the sides of the said window and that it comes into abutment below a shoulder 23 of the wall 11, which is extending towards the ring, starting from the border of the window 12, so as to limit the rotation of the ring in the upward direction.

The part of the large side 21 of the ring located just facing the window 12 constitutes a catching part 22, which is perpendicular to the direction 18, 19 of the ends 15, 16 and which engages the notch 6 of the hook 3, in the interlocked position (see FIG. 2).

In order to maintain in position the small side of the ring, the support 10 comprises a bracket 24, obtained by bending inwardly the sheet of the support below the said small side.

The system also comprises an unlocking pushing device 30, movable vertically and guided in a collar 31 connected to the upper side of the back of the seat 1.

The pushing device is linked to the ring, for example, by latching it onto the said ring, at a given distance from the ends 15, 16 and in such a way that the ring will pivot downwards by a pressure upon the pushing device.

In the shown example, the ring 14 is shaped in such a way that, when it is left free from any strain, the general plane P2 of the ring lies transversally with respect to the plane P1 containing the axes 18, 19 of the ends 15, 16. The relative inclination of these two planes is defined in such a manner that when the hook 3 is not inserted into the window 12 (FIGS. 1 and 4) the ring is in abutment under the shoulder 23, while undergoing a slight strain which guarantees that it is kept in its position.

In this position, the pushing device 30 projects substantially above the collar 31.

When the back of the seat is brought near to the hook 3, the sloping tip 5 of the latter comes into contact with the catching part 22 of the ring and pushes it back downwards while it brings about a swivelling of the ring (FIG. 4). When the notch 6 arrives in a position facing perpendicularly the catching part 22, the elasticity of the ring induces its shifting in the opposite direction and assures the locking by engagement of the said catching part 22 into the notch 6 (FIGS. 2 and 5).

The dimensions of the hook, and more particularly the depth of the notch, are such that in this position the ring is shifted angularly with respect to its previous resting position (non coupled hook) and it is nearly in the horizontal position. Due to this fact the pushing device, which is connected to the ring, is lower than in the inoperative position. Preferably the dimensions of the different pieces, mainly the length of the pushing device, are defined in such a manner that in this locked position the upper end of the pushing device 30 is flush to the upper border of the collar 31.

Thus, the pushing device constitutes, moreover, a visual indicator of the locking condition of the back of the seat. If the back of the seat is correctly locked, the pushing device is nearly not visible; if the back of the seat is not correctly locked, the pushing device overshoots substantially and is well visible.

In view of the unlocking, it is sufficient to press with the finger upon the pushing device, and this induces a downward shifting of the ring, the release of the catching part 22 from the notch 6 of the hook (FIG. 3) and allows the disengagement of the hook from the window 12 and the tilting of the back of the seat.

The invention is not limited to the locking system which has been described herebefore just as a mere example. More particularly the general shape of the ring can be different from a rectangle. Its arrangement with respect to the wall can be modified. With respect to the general plane of the ring, the ends of the ring can either be located within this plane, or located within a perpendicular plane, or delimit any angle with the said general plane, the orientation of the oblong hole which is maintaining the ends 15, 16 being in this case adapted in consequence.

As a function of the mechanical characteristics of the wire, of the general dimensions of the ring as well as of the desired stiffness for the said wire, it is also possible to modify the distance between the ends of the ring.

In the cases where a visualization of the locking is not required, the position of the ring, when the hook is locked, can be the same as when the hook is not engaged. The unlocking pushing device can be modified, or replaced by any other means, for example a lever, allowing to act upon the ring in order to achieve its pivoting.

We claim:

1. A locking system for movable vehicle seats comprising:
    a hook member extending in a predetermined direction and rigidly fixed to a stationary surface;
    a support element that is movable relative to the hook member;
    a wall of the support element having a window formed therein for receiving the hook member when the support element and the hook member are moved together;
    a shear resistant and elastically deformable wire ring mounted to the support element and having a sliding section thereof in sliding contact with the support element wall and traversing the window;
    an engageable portion of the sliding ring section being latched by the hook member when a predetermined length of the hook member passes through the window;
    the ring having two parallel free end portions adjacent one another and located in spaced relation to the sliding ring section;
    the end potions of the ring having offset axes that are oriented perpendicular to the support element wall, the axes further being laterally offset with respect to the window;
    engagement between the hook member and the ring engageable portion causing the ring to pivot about the axes while undergoing elastic deformation thereby displacing the ring sliding section in a direction parallel to the wall while contact is maintained between the wall and the sliding section until the hook member fully latches the engageable portion of the sliding ring section.

2. The system set forth in claim 1, wherein the ring has a rectangular shape;
    the two free end portions oriented in the direction of a supported leg of the ring, and extending beyond a periphery of the ring, the supported leg being the axis of rotation of the ring.

3. The system set forth in claim 1, wherein the axes of the free end portions are located in a first plane; and
    further wherein an area of the ring generally lies in a second plane transverse to the first plane.

4. The system set forth in claim 1, wherein the ring free end portions contact a bearing surface located in a return element that articulates from the support element wall and is parallel to the wall.

5. The system set forth in claim 4, wherein the ring is positioned between the support element wall and the return element; and
    further wherein the distance between the return element and the wall is substantially the same as a dimension of the ring in a direction extending from the ring sliding section toward the free end portions.

6. The system set forth in claim 1, further comprising a pushing device connected to a preselected point of the ring, the pushing device being displaceable in a direction substantially perpendicular to the second plane.

7. The system set forth in claim 6, further comprising a collar for slidingly receiving the pushing device; and
    wherein an upper end of the pushing device is flush with an upper surface of the collar, when the hook member is latched to the ring, and projects above the collar surface when unlatched.

8. The system set forth in claim 1, wherein a bracket integrally formed with the support element supports the supported leg of the ring.

* * * * *